US008849556B2

(12) United States Patent
Solbrack et al.

(10) Patent No.: US 8,849,556 B2
(45) Date of Patent: Sep. 30, 2014

(54) AUTOMATIC LEVELING CONTROL (75) Inventors: Jeff Solbrack, Colfax, WA (US); Dennis R. Solbrack, Colfax, WA (US)

(73) Assignee: Papé Machinery, Eugene, OR (US)

(*) Notice: Subject to any disclaimer, the term of this patent is extended or adjusted under 35 U.S.C. 154(b) by 451 days.

(21) Appl. No.: 13/284,736

(22) Filed: Oct. 28, 2011

(65) Prior Publication Data

US 2013/0110389 A1    May 2, 2013

(51) Int. Cl.
*G06F 17/10* (2006.01)
*B60G 17/019* (2006.01)
*B60G 17/0165* (2006.01)
*B60G 17/016* (2006.01)
*B60G 17/02* (2006.01)
*B60G 99/00* (2010.01)

(52) U.S. Cl.
CPC ...... *B60G 17/01908* (2013.01); *B60G 17/0165* (2013.01); *B60G 2500/30* (2013.01); *B60G 2400/10* (2013.01); *B60G 17/0162* (2013.01); *B60G 17/02* (2013.01); *B60G 99/002* (2013.01)
USPC .......................................................... 701/124

(58) Field of Classification Search
USPC .................... 701/19, 36, 38, 72, 124
See application file for complete search history.

(56) References Cited

U.S. PATENT DOCUMENTS

| 2004/0049330 A1* | 3/2004 | Fiorletta et al. | 701/37 |
| 2009/0312908 A1* | 12/2009 | Van Den Brink | 701/38 |
| 2011/0119028 A1* | 5/2011 | Bishop | 702/173 |

* cited by examiner

*Primary Examiner* — Kim T Nguyen (57) ABSTRACT

Representative implementations of devices and techniques provide leveling for a vehicle, such as an overland vehicle. Sensors associated with the vehicle may provide signals representing one or more operating conditions of the vehicle, including forces acting on the vehicle and a path of travel of the vehicle. The vehicle can be leveled based on one or more of the signals from the sensors.

20 Claims, 6 Drawing Sheets

AUTOMATIC LEVELING CONTROL

BACKGROUND

Various vehicles or implements that are configured for negotiating sloped terrain (such as hillside combines, excavation and construction equipment, military vehicles, etc.) may use leveling or tilt systems to level at least a portion of the vehicle (such as an operator cabin, a grain storage bin, etc.) while traversing the sloped terrain. Leveling systems cause a portion of the vehicle to be tilted to produce the leveling desired. For example, one or more axles of a vehicle may be tilted, with one end of the axle extended away from the body of the vehicle while the other end of the axle is more or less fixed or contracted toward the body of the vehicle. Such leveling systems often include techniques for sensing the slope of the terrain and then compensating for the slope by leveling portions of the vehicle while the vehicle is on the slope.

Many leveling systems have sensors that use gravity for sensing the slope of terrain. These sensors are generally not able to distinguish gravity from other forces, such as centrifugal force, for example, and may give inaccurate information as a result. For example, common techniques for sensing a slope include the use of accelerometers, liquid capacitive devices, electronic devices, electrolytic devices, devices that include a gas bubble in a liquid, and pendulum devices. Each of these types of sensing devices uses gravity to detect slope, and may be affected by other forces (e.g., centrifugal force, etc.) as well.

For example, when a vehicle turns a corner, the centrifugal force acting on the vehicle can be felt by a leveling sensor (e.g., clinometer, tilt meter, etc.), causing the leveling sensor to output an erroneous signal indicating that the vehicle is on a slope, even when the vehicle is on level terrain. This effect may be compounded with increased cornering speeds and/or with tighter turning circles. An erroneous signal from the leveling sensor can cause a vehicle such as a hillside combine, for example, to tilt the cabin, storage bin or whole machine while the vehicle is turning a corner on level terrain.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Representative implementations of devices and techniques provide leveling for a vehicle, such as an overland vehicle. Sensors associated with the vehicle may provide signals representing one or more operating conditions of the vehicle, including forces acting on the vehicle and a path of travel of the vehicle, for example. The vehicle can be tilted or leveled based on one or more of the signals from the sensors. Additionally, a vehicle leveling system can adjust or correct for erroneous tilting, for example, as a result of vehicle cornering.

In one aspect, a vehicle that is traversing sloped terrain may be leveled based on signals received from one or more leveling sensors configured to sense the sloped terrain. A signal from a leveling sensor may also be adjusted based on additional sensor signals. Additional sensor signals may indicate operating conditions of the vehicle, for example, whether the vehicle is cornering, the speed of the vehicle, and the like. A vehicle that is leveled based on an adjusted leveling signal may not level (tilt) when leveling is not needed, such as when the vehicle is on level terrain.

In alternate implementations, several or many sensors may be used to sense multiple operating conditions of a vehicle. The sensors may be used in various combinations to provide a leveling signal or to adjust a leveling signal.

Various implementations of devices and techniques for vehicle leveling are discussed in this disclosure. The devices and techniques are discussed with reference to example implementations illustrated in the figures. The devices and techniques discussed herein are referred to in the environment of an overland vehicle, such as a hillside combine, for ease of discussion and illustrative convenience. The devices and/or techniques may also be used in other environments, with other implementations, and associated with other vehicles, systems, and the like, to provide leveling.

Advantages of the disclosed devices and techniques are varied, and include: 1) prevention or reduction of vehicle over-tilting in corners and associated correction (no need to correct for over-tilting when turning corners); 2) prevention or elimination of overworking the mechanical, hydraulic, and electrical tilting mechanisms, reducing wear and reducing energy loss; 3) reduction or elimination of time waiting for the vehicle to correct after erroneously tilting; 4) maintaining key portions of the vehicle in a level state (such as a grain tank on a harvester-saving potential losses from crop spilling); 5) maintaining better traction of the vehicle and keeping proper vehicle balance; and 6) reliable system operation to help keep an operator focussed on control of the vehicle without unnecessary distractions. Other advantages of the disclosed techniques may also be present.

Implementations are explained in more detail below using a plurality of examples. Although various implementations and examples are discussed here and below, further implementations and examples may be possible by combining the features and elements of individual implementations and examples.

Example Leveling System

Figure 1:
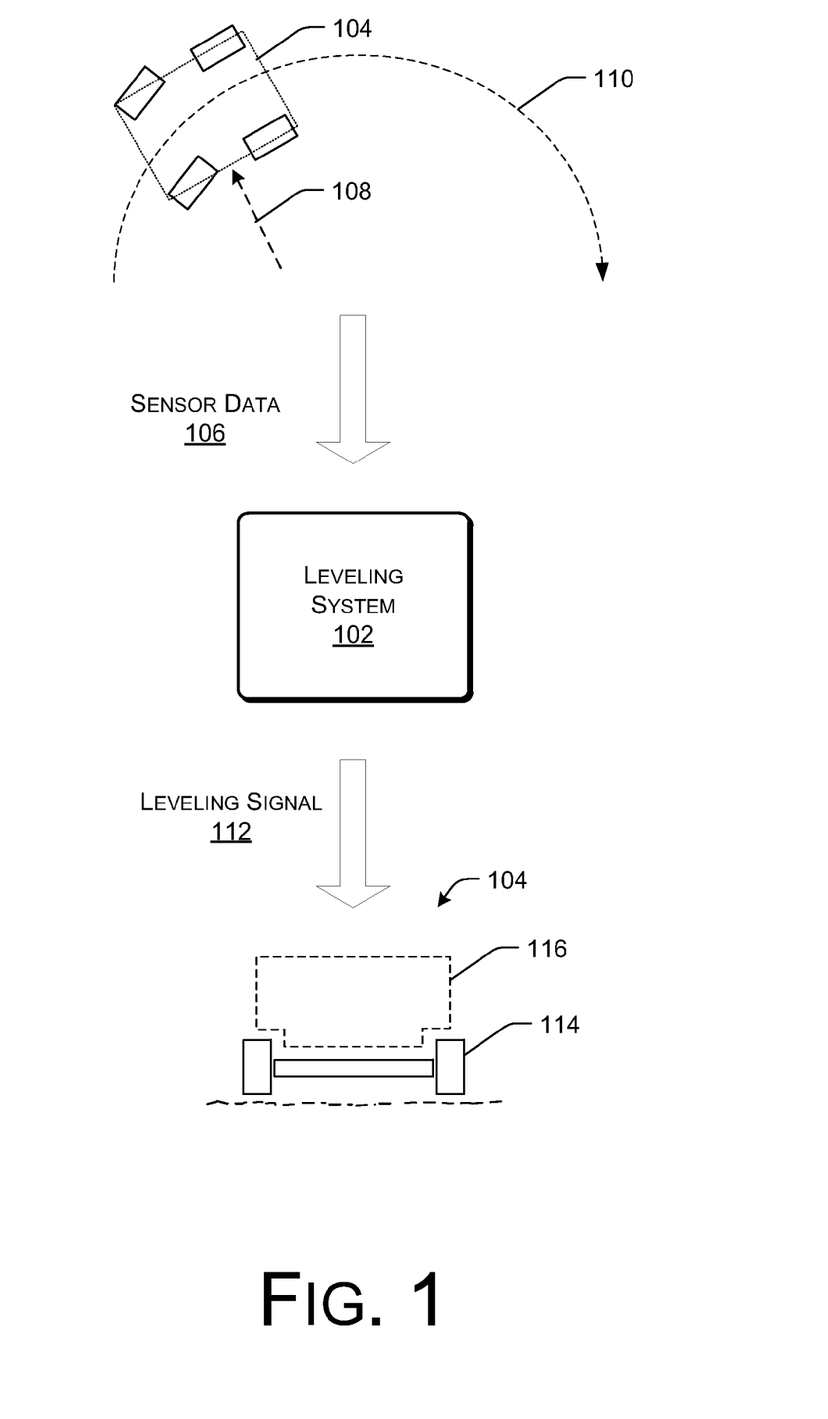
FIG. 1 is a schematic of an example leveling system implemented with respect to a vehicle, in which the techniques and devices in accordance with the present disclosure may be embodied.

FIG. 1 is a schematic of an example leveling system 102 implemented with respect to a vehicle 104, in which the techniques and devices in accordance with the present disclosure may be embodied. It is to be understood that the techniques and/or devices may be implemented as part of the vehicle 104, as an accessory to the vehicle 104, or as part of another system (for example as a remote system to the vehicle 104, etc.). Further, portions of a leveling system 102 may be integrated with the vehicle 104 while other portions are remotely located.

The vehicle 104 of the figures and disclosure is illustrated and discussed in generic terms and often described in terms of a "hillside combine harvester" device. This is, however, for ease of discussion. The techniques and devices described herein with respect to leveling systems is not so limited, and may be applied to other types of vehicles (e.g., farming equipment, excavation equipment, construction equipment, military vehicles, recreational vehicles, etc.) without departing from the scope of the disclosure. Further, while the illustrated vehicle 104 is shown as a simple vehicle having four wheels, the techniques and devices described herein are intended for implementation with vehicles having single or multiple axles, any number of wheels, and any number of steerable wheels or axles. Vehicles for overland travel are intended embodiments, as well as amphibious vehicles, and the like.

As shown in FIG. 1, an example leveling system 102 may be arranged to receive sensor data 106 from one or more sensors associated with a vehicle 104. For example, a vehicle 104 may be leveled by a leveling system 102 based on a first signal representing a lateral force 108 acting on the vehicle 104 and a second signal representing a path of travel 110 of the vehicle 104. The first and second signals may be sent by one or more vehicle sensors associated with the vehicle 104, and received by the leveling system 102.

In one embodiment, the vehicle leveling may include adjusting a leveling signal 112 when the second signal indicates a curved path of travel 110. In this embodiment, the leveling signal 112 is adjusted to compensate for the effects of centrifugal force on the first signal (first vehicle sensor) and the leveling system 102. For example, the leveling signal 112 may be adjusted to reduce or eliminate the tilting of an axle 114 away from the vehicle body 116 during vehicle cornering. Accordingly, the vehicle 104 may have a more level posture during cornering.

In another embodiment, the leveling may include receiving a third signal representing a speed of the vehicle by the leveling system 102. The third signal may be received from a third sensor associated with the vehicle. In one embodiment, the vehicle is leveled based on a combination of the first, second, and third signals. In alternate embodiments, the vehicle is leveled based on one or more of the first, second, and third signals in various combinations.

In one embodiment, the leveling signal 112 may be generated by adjusting the first signal based on the second and/or third signals. For example, in an embodiment, the first signal is based on an orientation of the vehicle 104 with respect to gravity. When the vehicle 104 corners, the vehicle 104 experiences the effects of centrifugal force. These effects may be detected by the first vehicle sensor, and contribute to the first signal sent to the leveling system 102. Thus, the first signal may be based at least in part on centrifugal force acting on the vehicle 104.

In an embodiment, the second and/or third signals may be interpreted by the leveling system 102 to indicate that the vehicle is cornering, perhaps exceeding a threshold speed, and is therefore experiencing an amount of centrifugal force. The leveling system 102 may adjust the leveling signal 112 to reduce the effects of centrifugal force on the leveling signal 112, and prevent or reduce tilting of the vehicle 104 while cornering.

In one embodiment, the second signal represents a wheel angle of the vehicle 104. For example, the second sensor may be a wheel angle sensor, or the like, indicating an angle of a wheel relative to straight or parallel with the vehicle 104 (indicating the angle of the wheel with respect to a centerline of the vehicle, for example). In various embodiments, one or more of well-known wheel angle sensors (e.g., mechanical, optical, electrical or electronic, etc.) may be employed to provide the second signal. The angle of the wheel measured can be used to determine a path of travel for the vehicle, including the radius of a circle during cornering.

In another embodiment, the third signal represents a speed of rotation of a component of the vehicle 104. For example, the third sensor may be an angular velocity sensor, or the like. In an embodiment, the third sensor is a component of the transmission, final drive, or other portion of the drive train of the vehicle 104. In one instance, the speed of rotation of the flywheel, or a similar component, may be measured and the measurement converted to determine the speed of the vehicle 104. In various embodiments, one or more of well-known angular velocity sensors (e.g., mechanical, magnetic, optical, electrical or electronic, etc.) may be employed to provide the third signal. In another embodiment, a global positioning satellite system (GPS), or the like, may be employed to measure the linear speed of the vehicle 104 directly. In various other embodiments, other linear measurement sensors and/or devices (optical, sonar, radio frequency (RF), etc.) may be used to provide the third signal.

In an embodiment, one or more of the first, second, and third signals may be received by the leveling system 102 via a controller area network (CAN) bus infrastructure. In other embodiments, other or additional bus structures, communication techniques (e.g., wired and/or wireless), and the like, may be used to transmit and receive sensor signals (i.e., the first, second, and third signals, etc.) to and from the leveling system 102. Further, in various embodiments, multiple other sensors and associated signals may be used in a leveling system 102 for leveling a vehicle 104.

Example Embodiments

Figure 2:
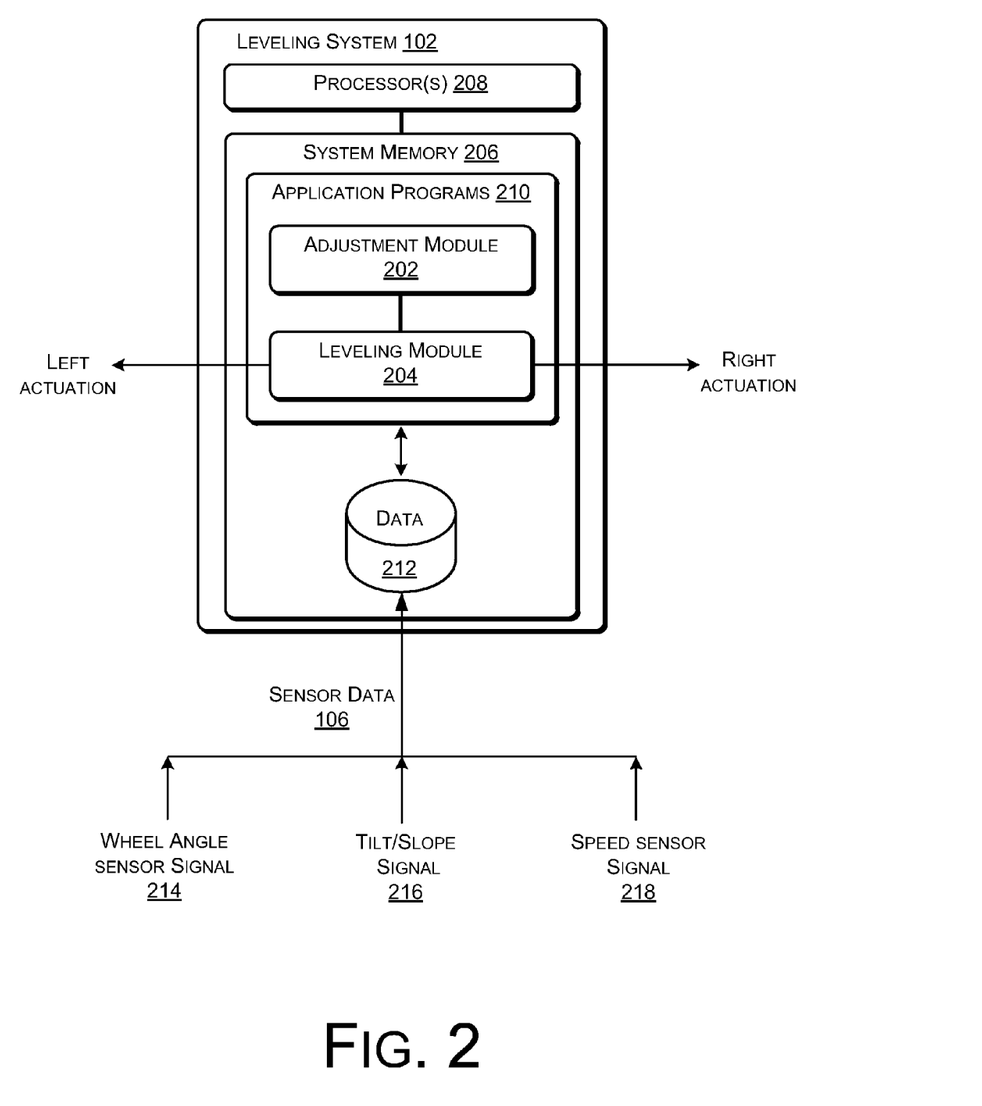
FIG. 2 is a block diagram showing example detail of a leveling system implemented as in FIG. 1.

FIG. 2 is a block diagram showing example detail of a leveling system 102 implemented, for example, as in FIG. 1. The leveling system 102 may be partially or completely implemented using specialized or generic computing equipment (such as one or more processors 208) coupled to one or more memory devices (such as system memory 206). In one embodiment, the leveling system 102 is implemented using a CAN-based architecture. In other embodiments, the leveling system 102 may be based on other computing architectures and/or bus systems.

An example leveling system 102 for a vehicle 104 may include a plurality of sensors coupled to the vehicle 104. In other implementations, one or more sensors may be remote to the vehicle. Sensors may be arranged to provide information (such as sensor data 106) to the leveling system 102 about the operating environment of the vehicle 104 and/or the state of various vehicle components and systems (e.g., wheel angle sensor signal 214, tilt/slope signal 216, speed sensor signal 218, etc.).

In one embodiment, the system memory 206 of leveling system 102 includes application programs 210 and system data 212. In various embodiments, the system memory 206 may also include other modules, components, and the like (e.g., BIOS, controller(s), communication modules, etc.) that are used for performing the functions described herein.

In an implementation, the leveling system 102 also includes an adjustment module 202 and a leveling module 204. In various embodiments, the adjustment module 202 and/or leveling module 204 may be implemented in system memory 206 and/or application programs 210.

All or portions of the subject matter of this disclosure, including the leveling system 102, application programs 210, the adjustment module 202 and/or the leveling module 204 (as well as other components, if present) can be implemented as a system, method, apparatus, or article of manufacture, using standard programming and/or engineering techniques to produce software, firmware, hardware or any combination thereof to control a computer or processor to implement the disclosure. For example, an example leveling system 102 may be implemented using any form of computer-readable media (shown as system memory 206 in FIG. 2, for example) that is accessible by the processor(s) 208. Computer-readable media may include, for example, computer storage media and communications media.

Computer-readable storage media includes volatile and nonvolatile, removable and non-removable media implemented in any method or technology for storage of information such as computer-readable instructions, data structures, program modules or other data. Memory 206 is an example of computer-readable storage media. Additional types of computer-readable storage media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may accessed by the processor(s) 208.

In contrast, communication media typically embodies computer readable instructions, data structures, program modules, or other data in a modulated data signal, such as a carrier wave, or other transport mechanism.

While the subject matter of the disclosure may be described in the general context of computer-executable instructions of a computer program that runs on a computer and/or computers, those skilled in the art will recognize that the subject matter also may be implemented in combination with other program modules. Generally, program modules include routines, programs, components, data structures, and the like, which perform particular tasks and/or implement particular abstract data types.

Moreover, those skilled in the art will appreciate that the innovative techniques can be practiced with other computer system configurations, including single-processor or multi-processor computer systems, microprocessor-based or programmable consumer or industrial electronics, and the like. The illustrated aspects may also be practiced in distributed computing environments where tasks are performed by remote processing devices that are linked through a communications network. However, some, if not all aspects of the disclosure can be practiced on stand-alone computers or computer modules. In a distributed computing environment, program modules may be located in both local and remote memory storage devices.

Referring to FIG. 2, in one example embodiment, the leveling system 102 receives a first signal representing a lateral force acting on the vehicle (e.g., tilt/slope signal 216). In an implementation, the first signal is received from a first vehicle sensor by the adjustment module 202. In other implementations, the first signal is received by another portion of the leveling system 102, such as the leveling module 204, for example. In various embodiments, the first vehicle sensor is a device configured to represent an orientation of the vehicle 104 with respect to gravity. For example, in one embodiment, the first vehicle sensor is a clinometer (inclinometer) configured to indicate a lateral tilt of the vehicle 104. In other embodiments, the first vehicle sensor may comprise one or more of an accelerometer, a gyroscope, a liquid capacitive device, an electrolytic level device, a gas bubble in liquid device, a pendulum device, and the like.

In one embodiment, the first vehicle sensor is arranged to produce a voltage proportional to a measured tilt/slope. In other embodiments, the first vehicle sensor is arranged to produce other types of signals, such as optical signals, magnetic signals, alternating signals, digital signals, and the like.

In an embodiment, the leveling system 102 receives a second signal representing a direction of travel of the vehicle 104 (e.g., wheel angle sensor signal 214). In an implementation, the second signal is received from a second vehicle sensor by the adjustment module 202. In other implementations, the second signal is received by another portion of the leveling system 102, such as the leveling module 204, for example. In various embodiments, the second vehicle sensor is a device configured to indicate an angle of at least one of the vehicle's wheels with respect to a centerline of the vehicle, for example. In various embodiments, the second vehicle sensor is a wheel angle sensor comprising one or technologies, such as mechanical, optical, magnetic, electronic, and like technologies.

In one embodiment, the leveling system 102 and/or the adjustment module 202 is arranged to generate a leveling signal 112 based on at least the first signal and the second signal. In other embodiments, the leveling signal 112 is generated based on one or both of the first and second signals in combination with one or more other sensor signals (e.g., accelerometer signal, gyroscope signal, etc.). For example, in one embodiment, the adjustment module 202 is configured to receive one or more other signals representing operating conditions of the vehicle 104, and is configured to generate the leveling signal 112 based on at least the first signal, the second signal, and the one or more other signals.

In one embodiment, the leveling module 204 is configured to generate the leveling signal 112. In other embodiments, other modules may be configured to generate the leveling signal 112. The leveling signal 112 is used by the leveling system 102 to control actuation of vehicle leveling mechanism(s). For example, in one embodiment, the leveling system 102 sends a leveling signal 112 to one or more vehicle leveling mechanisms (not shown), causing one or more of the vehicle axles 114 to tilt relative to the vehicle body 116. In one instance, one or more axles 114 of the vehicle 104 may be tilted, with one end of the axle 114 extended away from the body 116 of the vehicle 104 while the other end of the axle 114 is more or less fixed or is contracted toward the body 116 of the vehicle 104. In other instances, the leveling signal 112 may cause one or more axles 114 of the vehicle 104 to pivot about a point relative to the body 116 of the vehicle 104.

In a further embodiment, the adjustment module 202 is configured to receive a third signal representing a speed of the vehicle 104, and is configured to generate the leveling signal 112 based on at least the first, second, and third signals. For example, if the vehicle 104 is cornering on level terrain, the cornering may cause the vehicle 104, and the first vehicle sensor, to feel the effects of centrifugal force. The tighter the turning circle of the vehicle 104, the greater the centrifugal force effect, and/or the greater the speed of the vehicle 104, the greater the centrifugal force effect. This is consistent with the formula for centrifugal force which equates to the square of the angular velocity of the vehicle multiplied by the radius of the turning circle.

If the first sensor detects tilt/slope based on gravity, then the first sensor may not be able to distinguish the effects of centrifugal force from the force of gravity. Accordingly, the first sensor may send a first signal (e.g., tilt/slope signal 216) to the leveling system 102, indicating that the vehicle 104 is tilting. However, if the second vehicle sensor sends a second signal indicating a wheel angle associated with vehicle cornering, and the third vehicle sensor sends a third signal indicating a particular vehicle speed (e.g., exceeding a threshold speed), then the adjustment module 202 may generate a leveling signal 112 that adjusts the first signal, for example, to compensate for the effects of centrifugal force on the first sensor. Then, the adjusted leveling signal 112 sent to the leveling system 102 may indicate that the vehicle is not tilting as much or is not tilting at all due to terrain. In that case, based on the adjusted leveling signal 112, the tilting mechanism(s) may not act to tilt an axle 114 with respect to the body 116 of the vehicle.

In an embodiment, the compensation based on the second and/or third signals is dynamic and takes into consideration continuous wheel angle measurements and vehicle speed measurements. In that case, the adjustment module 202 dynamically adjusts the leveling signal 112 in real time or near real time. For example, based on one or both of wheel angle (and thus, turning radius) and vehicle speed (or angular velocity), the effects of centrifugal force on the first sensor can be calculated or estimated.

In an embodiment, the leveling system 102 (using one or more of the processor(s) 208, the adjustment module 202, the leveling module 204, or the like) calculates the centrifugal force effect and/or a correction value to the centrifugal force effect, based on at least one of wheel angle measured and speed measured. The leveling system 102 (using one or more of the adjustment module 202, the leveling module 204, or the like) generates a leveling signal 112 based on the calculation (or adjusts the first signal based on the calculation) to remove or reduce the effects of centrifugal force on the leveling signal 112. In other words, the first signal is adjusted based on the portion of the first signal that represents (is due to) centrifugal force acting on the vehicle 104. Thus, the leveling signal 112 sent to the leveling mechanism(s) is based substantially on the actual slope of the terrain that the vehicle 104 is traversing (if any).

If included, the leveling module 204 (as shown in FIG. 2) may receive the (adjusted) leveling signal 112 and send the information therein to the leveling mechanism(s). In other words, the leveling module 204 may generate and output left and right (port and starboard) actuation signals, for example, to left and right (port and starboard) leveling mechanisms (such as hydraulic tilt systems, etc.).

Figure 3A:
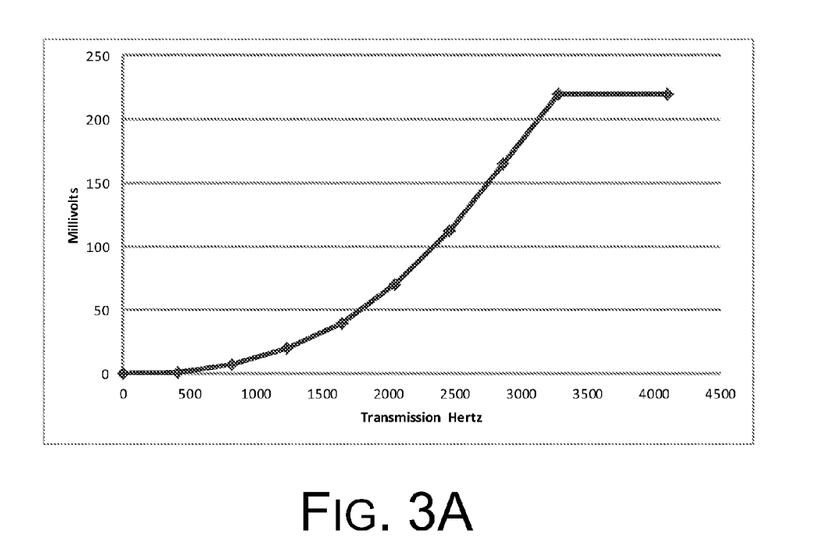
FIGS. 3A and 3B show graphs of example values that may be applied to adjust a leveling signal to compensate for the effects of centrifugal force, according to one embodiment.
Figure 3B:
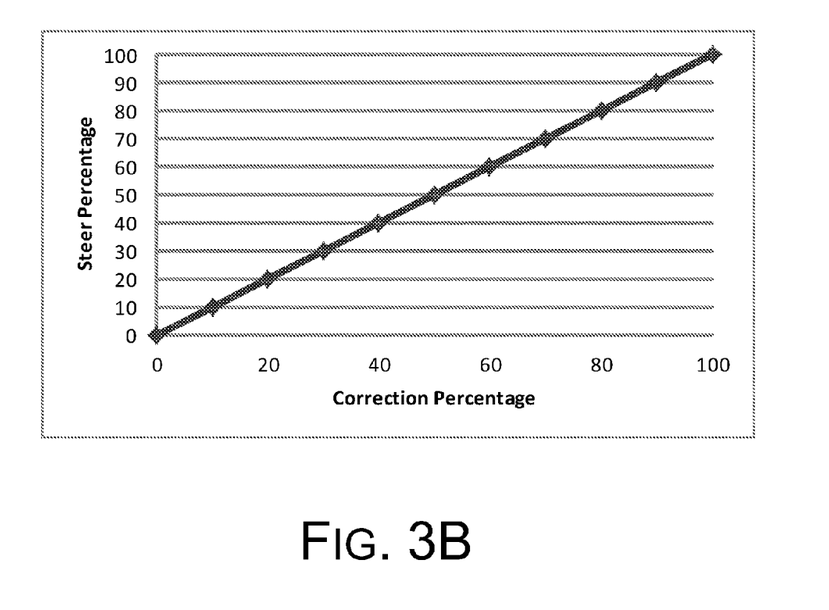

FIGS. 3A and 3B show graphs of example values that may be applied to adjust a leveling signal 112 to compensate for the effects of centrifugal force on the first sensor. In various embodiments, correction values that are calculated based on the second and/or third vehicle sensors may be plotted onto one or more graphs or charts (such as the graphs of FIGS. 3A and 3B), and may be used as a basis for correcting the output of the first vehicle sensor. For example, input from one or more of the vehicle speed and/or wheel angle may be used to create a "correction chart" that can be the basis for correcting the leveling signal 112. As shown in FIGS. 3A and 3B, the faster the vehicle speed and/or the tighter the radius of the turning circle, the more adjustment may be made to the leveling signal 112. The slower the vehicle speed and/or the wider the radius of the circle, the less adjustment may be needed. The adjustment calculated (and shown in the graphs of FIGS. 3A and/or 3B) may either be added or subtracted from the leveling signal 112 to correct the leveling signal 112 for the effects of centrifugal force. In one embodiment, the correction value may be added to the leveling signal 112 or subtracted from the leveling signal 112 based on whether the vehicle 104 is making a left-hand turn or a right-hand turn.

In one implementation, one or more correction charts (such as the graphs of FIGS. 3A and/or 3B) may be generated from raw data collected from the first, second, and/or third vehicle sensors during operation of the vehicle 104. This may include operating the vehicle 104 on flat and sloped terrain, in straight or curved paths, and the like, and collecting data from the sensor(s) under varying terrain and cornering conditions. In some implementations, one or more correction charts (such as the graphs of FIGS. 3A and/or 3B) may be stored in memory (such as system memory 206, data 212, and the like) or may be stored in other local or remote locations so as to be available to the processor(s) 208, the adjustment module 202, and/or the leveling module 204.

In one embodiment, as shown in FIG. 3A, the output of a clinometer (the first sensor) in millivolts can be adjusted based on vehicle speed measurements. For example, in one embodiment, as shown, vehicle speed is measured by detecting the speed of rotation of the vehicle transmission in rotations per second (hertz). Based on the size of the vehicle's wheels, as well as dimensions of other components of the drive-train, the speed of the vehicle can be derived from the speed of rotation of the vehicle transmission, for example. The graph of FIG. 3A illustrates that correction of the output of the first sensor may be based on an exponential relationship with the vehicle's speed (detected as transmission rotations in hertz). For example, the output of the clinometer (in millivolts) may be adjusted by adding or subtracting a value (in millivolts) from the graph of FIG. 3A corresponding to the detected vehicle speed. The curve shown is one example of a relationship that may be used to generate correction values that reduce or remove the effects of centrifugal force on the first sensor. In this example, the relationship is based on the angular velocity of the vehicle 104 squared, multiplied by a fixed turning radius (here the turning radius is approximately 8'). In other embodiments, other relationships may be used to generate correction values based on the devices and/or sensors used. As shown in FIG. 3A, the output of the first sensor may be adjusted dynamically over a range of vehicle speeds. In one embodiment, as shown, the correction to the output of the first sensor may remain constant (if desired) once the vehicle achieves a preset speed threshold.

In the example shown in FIG. 3A, the graph is based on a full-steer condition. In other words, the vehicle 104 is cornering as tightly as it is capable. For less than full-steer conditions, correction values may be scaled. For instance, wheel angle measurements may be used to correct the output signal from the first sensor. This is shown, for example, in the graph of FIG. 3B. In one embodiment, as shown in FIG. 3B, the amount of correction to the output of the first sensor can be adjusted based on the steer percentage (e.g., percent of full-steer, which reflects the turning radius of the vehicle). FIG. 3B shows a linear adjustment to the correction values of FIG. 3A, for example. For a half-steer condition (50% steer percentage), the correction values may be scaled by 50%. In other embodiments, other methods may be used in conjunction with wheel angle measurements to adjust the output of the first sensor, based on the devices and/or sensors used (i.e., exponential scaling, linear scaling, logarithmic scaling, etc.). As discussed, the first signal adjusted based on vehicle speed measurements and/or wheel angle measurements may comprise the adjusted leveling signal 112.

Figure 4:
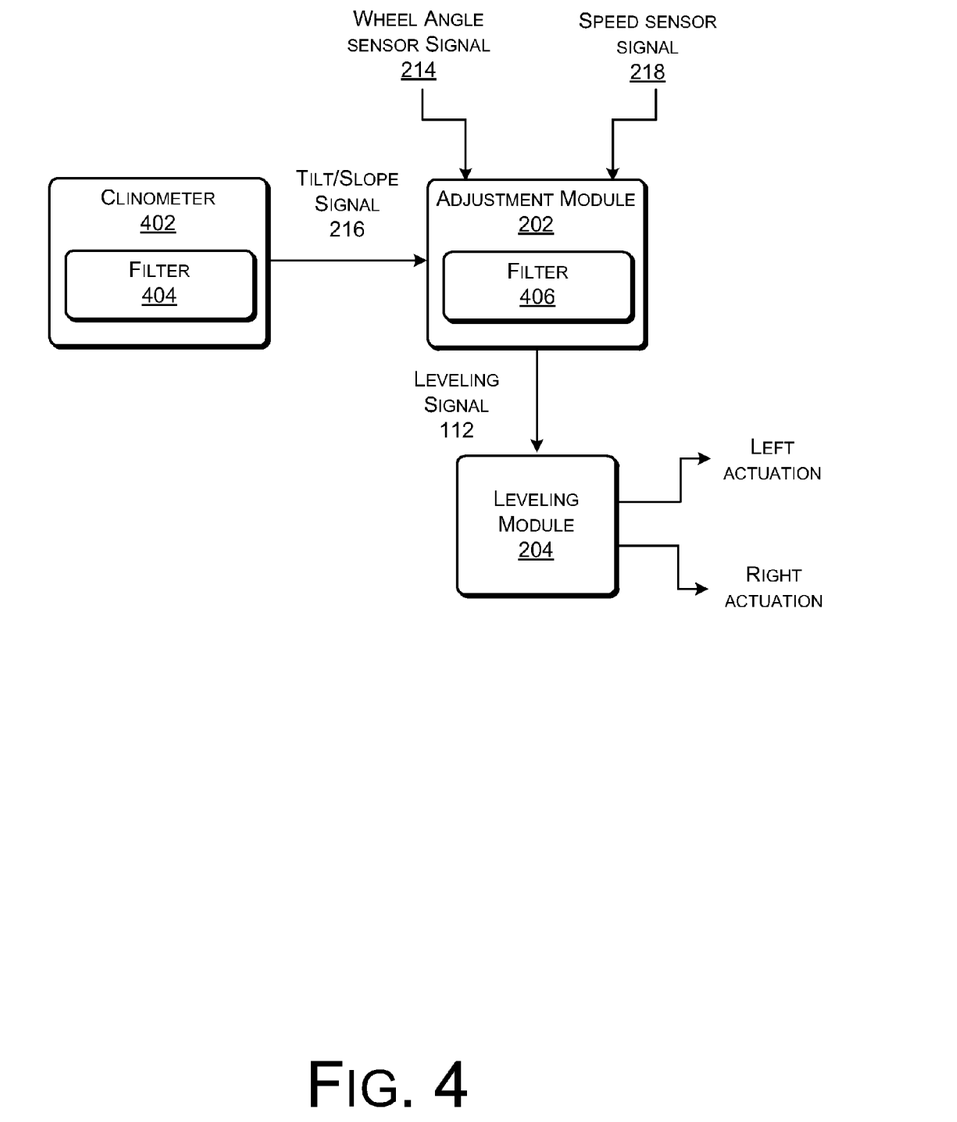
FIG. 4 is a block diagram of an example leveling system including one or more filters, according to another embodiment.

FIG. 4 is a block diagram of an example leveling system 102 including one or more filters, according to another embodiment. In one embodiment, the leveling system 102 includes a clinometer 402 (or other first vehicle sensor) having a filter 404. The filter 404 is configured to remove transients or spikes from the first signal (e.g., tilt/slope signal 216). Transients in the first signal may represent bumps, holes, or other aberrations in the terrain that do not represent the general slope of the terrain. The filter 404 is configured to remove transients, for example, to prevent the transients from resulting in erratic or erroneous leveling signals 112 based on instantaneous changes in output of the clinometer 402.

In an embodiment, the adjustment module 202 includes a filter 406 that tracks the filter 404. For example, the filter 406 may be designed to match a rate of change of the output of the filter 404. In various embodiments, the filter 406 may be implemented using logic, software, firmware, and the like.

In one embodiment, the adjustment module 202 includes a filter 406 configured to filter sensor data 106 based on a preset rate of change of the sensor data 106, the adjustment module 202 being configured to generate the leveling signal 112 based on the filtered sensor data 106.

Example Operation

Figure 5:
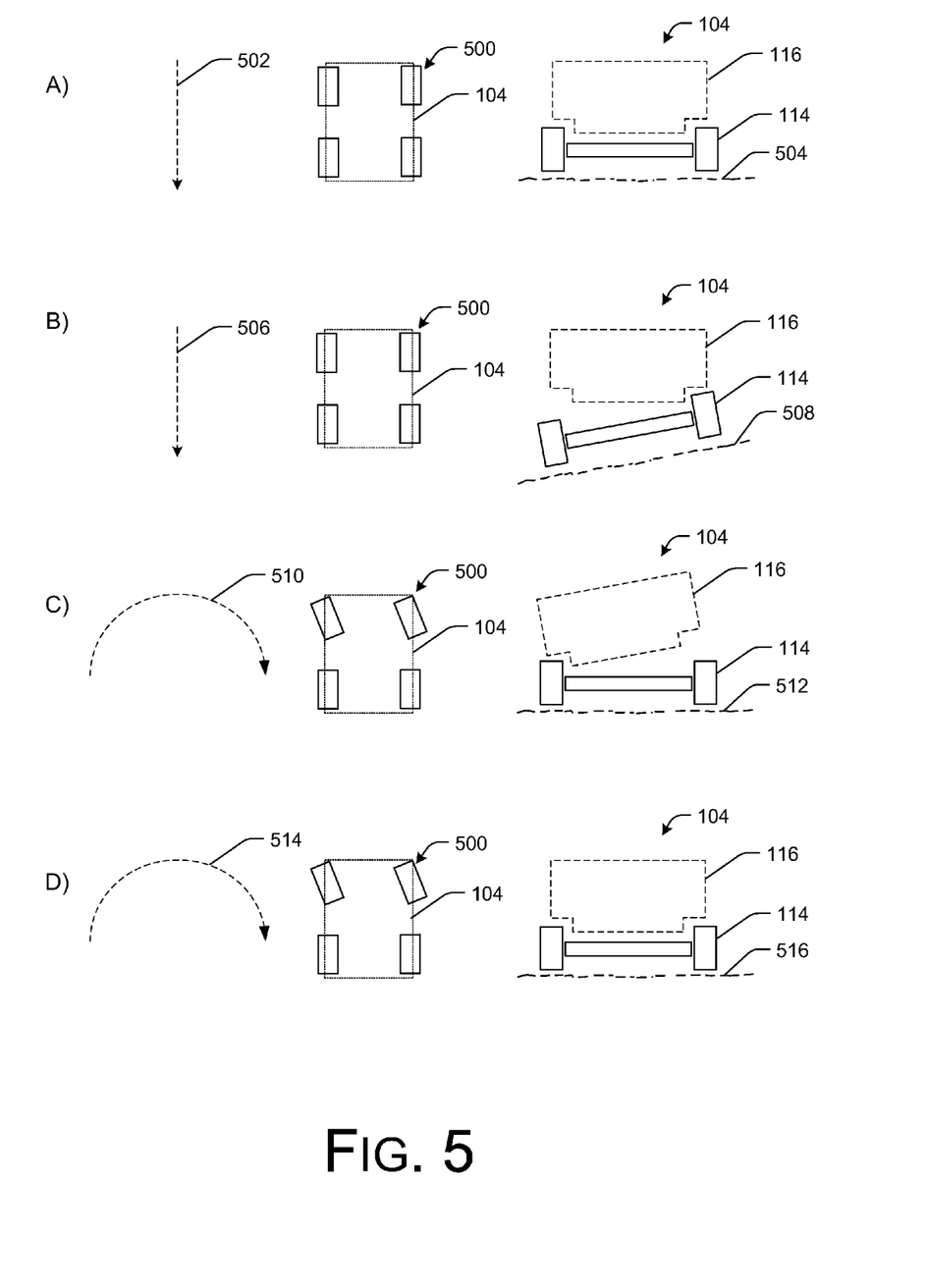
FIG. 5 is a series of illustrations showing implementations of example leveling systems. The illustrations show responses from the leveling systems to various forces and paths of travel associated with a vehicle.

FIG. 5 is a series of illustrations (A-D) showing implementations of example leveling systems 102. The illustrations (A-D) show responses from the leveling systems 102 to various forces and paths of travel associated with a vehicle 104. Each of the illustrations (A-D) show a vehicle path, an overhead-view of the vehicle 104 including wheel positions 500 (i.e., wheel angle), and a front-view of the vehicle 104 showing an axle 114 position in relation to the body 116.

FIG. 5, A) illustrates a vehicle 104 that is traversing a substantially straight path on substantially level terrain. FIG. 5, A) shows a substantially straight vehicle path 502. This is also indicated by the wheel positions 500 of the vehicle 104, as shown in the overhead-view. As seen in the front-view, the terrain 504 is substantially level. Accordingly, the first signal sent to the leveling system 102 does not indicate a tilt/slope, so the axle 114 is in a rest position (no tilt) with respect to the body 116 of the vehicle 104.

FIG. 5, B) illustrates a vehicle 104 that is traversing a substantially straight path on sloped terrain. FIG. 5, B) shows a substantially straight vehicle path 506. This is also indicated by the wheel positions 500 of the vehicle 104, as shown in the overhead-view. As seen in the front-view, the terrain 508 is substantially sloped. Accordingly, the first signal sent to the leveling system 102 indicates a tilt/slope, so the axle 114 is caused to tilt with respect to the body 116 of the vehicle 104. The tilt of the axle 114 relative to the sloped terrain 508 provides for the body 116 to be level.

FIG. 5, C) illustrates a vehicle 104 that is cornering on substantially level terrain with an uncorrected (unadjusted) leveling signal 112. FIG. 5, C) shows a substantially curved vehicle path 510, as if the vehicle 104 is turning a corner. This is also indicated by the wheel positions 500 of the vehicle 104, as shown in the overhead-view. As seen in the front-view, the terrain 512 is substantially level. However, due to the centrifugal force felt by the vehicle 104, because of the cornering, the first signal sent to the leveling system 102 indicates a tilt/slope. The axle 114 is caused to tilt with respect to the body 116 of the vehicle 104, based on the tilt/slope information of the uncorrected (unadjusted) leveling signal 112. The tilt of the axle 114 relative to the level terrain 512 results in the body 116 being erroneously tilted.

FIG. 5, D) illustrates a vehicle 104 that is cornering on substantially level terrain with a corrected (adjusted) leveling signal 112. FIG. 5, D) shows a substantially curved vehicle path 514, as if the vehicle 104 is turning a corner. This is also indicated by the wheel positions 500 of the vehicle 104, as shown in the overhead-view. As seen in the front-view, the terrain 516 is substantially level. Due to the centrifugal force felt by the vehicle 104, because of the cornering, the first signal sent to the leveling system 102 indicates a tilt/slope. However, due to the second signal indicating wheel angle and/or the third signal indicating vehicle speed, the axle 114 remains in a rest position (no tilt) with respect to the body 116 of the vehicle 104. The leveling signal 112, which would have indicated a tilt/slope due to the first signal, is corrected based on the second and/or third signals received at the leveling system 102. Here, the body 116 remains substantially level during cornering of the vehicle 104.

Additionally, a vehicle 104 that is cornering on sloped terrain with a corrected (adjusted) leveling signal 112 tilts based on the corrected leveling signal 112. For example, the vehicle 104 may be traversing a substantially curved vehicle path on sloped terrain. Accordingly, the first signal sent to the leveling system 102 indicates a tilt/slope, where the first signal is based on the slope of the terrain as well as the centrifugal force felt by the vehicle 104 due to the cornering. Thus, the first signal may indicate an erroneous slope than actually exists due to the centrifugal force felt. A second signal is sent to the leveling system 102 indicating wheel angle, and/or a third signal is sent to the leveling system 102 indicating vehicle speed. The leveling signal 112, which would have indicated an erroneous tilt/slope due to the first signal, is corrected based on the second and/or third signals received at the leveling system 102. The axle 114 is caused to tilt with respect to the body 116 of the vehicle 104, but the tilt is corrected to reflect the actual slope of the terrain, without the effects of centrifugal force. The tilt of the axle 114 relative to the sloped terrain provides for the body 116 to be level.

In alternate embodiments, additional or other signals may be received by the leveling system 102 to adjust or correct the leveling signal 112, and reduce or prevent erroneous tilting of the vehicle 104.

Representative Process

Figure 6:
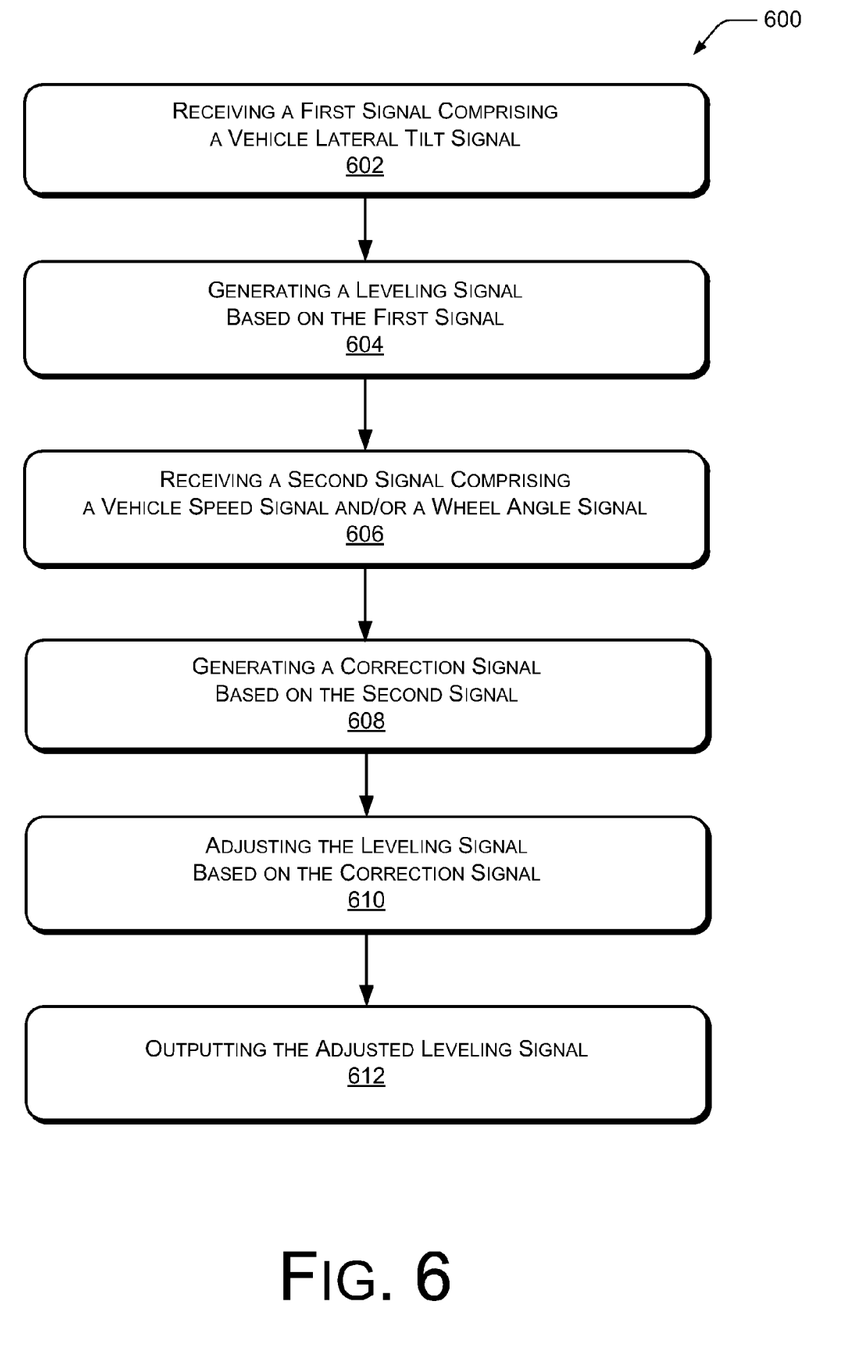
FIG. 6 is a flow diagram illustrating an example leveling process using sensor signals according to an implementation.

FIG. 6 illustrates a representative process 600 for implementing techniques and/or devices relative to leveling a vehicle (such as vehicle 104). The process 600 may also include receiving signals from remote or local sensors, and leveling the vehicle based on the signals received. Additionally, a process 600 may include reducing or eliminating erroneous vehicle tilting, such as may occur when a vehicle corners or experiences similar conditions. For example, a vehicle may experience centrifugal force when cornering, and the centrifugal force may be interpreted by a leveling system as an indication that the vehicle is traversing sloped terrain. Based on other signals received by the leveling system, the process 600 may reduce or eliminate vehicle tilting based on centrifugal force. The example process 600 is described with reference to FIGS. 1-5.

At block 602, the process includes receiving a first signal comprising a vehicle lateral tilt signal. In one embodiment, the first signal is received from a clinometer or like device for measuring tilt/slope. In an embodiment, the first signal is received by a leveling system (such as leveling system 102). In various implementations, the tilt/slope sensor device may be mounted to the vehicle or remote to the vehicle. Also, in various implementations, the tilt/slope sensor device may be comprised of a single component or multiple components, where one or more of the multiple components are mounted to the vehicle. In alternate implementations, additional sensors may be coupled to the vehicle, and remain within the scope of the disclosure.

At block 604, the process includes generating a leveling signal (such as leveling signal 112) based on the first signal. For example, the first signal may indicate a measured tilt/slope. The process 600 includes generating a leveling signal based on the measured tilt/slope information from the first signal. In various embodiments, the leveling signal may be generated by the leveling system, the adjustment module, the leveling module, or another component of the leveling system.

At block 606, the process includes receiving a second signal comprising a vehicle speed signal and/or receiving a third signal comprising a wheel angle signal. In an embodiment, the second signal is received from a vehicle speed sensor, vehicle component speed sensor or like device or combination of devices. In an embodiment, the third signal is received from a wheel angle sensor or like device or combination of devices. In an embodiment the second and/or third signals are received by the leveling system (such as leveling system 102). In various embodiments, one or both of the second and third signals are received, alone or in combination with other signals.

In various embodiments, one or more of the first, second, and third signals are variable direct current (DC) voltage signals. In other embodiments, the first, second, and third signals may be alternating current (AC) signals, optical signals, radio frequency (RF) signals, or other wired or wireless signals (e.g., CAN-bus, Ethernet, Bluetooth™, Wi-Fi™, Wi-Max™, and the like).

At block 608, the process includes generating a correction signal based on the second signal, the third signal, or both the second signal and the third signal. For example, the process 600 may include receiving information relative to a speed of the vehicle and/or receiving information relative to an angle of one or more of the wheels (indicating that the vehicle may be cornering, for example), and generating a correction signal to be applied with respect to the leveling signal, the first signal, or the like. In various embodiments, the correction signal may be generated by the leveling system, the adjustment module, the leveling module, or another component of the leveling system. In some embodiments, the process includes generating and/or accessing one or more correction charts comprised of correction values (such as the graphs of FIGS. 3A and/or 3B) to generate the correction signal.

At block 610, the process includes adjusting the leveling signal based on the correction signal to produce an adjusted leveling signal. In various embodiments, the leveling system is adjusted by the leveling system, the adjustment module, the leveling module, or another component of the leveling system. In a further implementation, the leveling signal is generated with the correction applied, instead of generated and then adjusted. In one implementation, the first signal is adjusted based on one or more of the second or third signals to generate the adjusted leveling signal. In an embodiment, the first signal is combined with the correction signal to produce the adjusted leveling signal.

In another embodiment, the correction signal is subtracted from one or more inputs to the leveling system. In another embodiment, the correction signal is added to one or more inputs to the leveling system. For example, the correction signal may represent the speed of the vehicle and the wheel angle of one or more wheels of the vehicle. If the correction signal, based on that information, indicates that the vehicle is making a high speed turn, then the correction signal may be subtracted or added to the first signal, for example. It may be subtracted, for example, if the correction signal has the same polarity as the first signal, or it may be added if the correction signal has an opposite polarity as the first signal. In other implementations, the correction signal may be combined, added to, or subtracted from other inputs to the leveling system.

At block 612, the process includes outputting the adjusted leveling signal to the leveling system. In various embodiments, the adjustment module, the leveling module, or another module or system outputs the adjusted leveling signal to the leveling system. In an implementation, the leveling signal is output to the leveling module. In some implementations, the leveling signal is generated by the leveling module or the leveling system. In an embodiment, the process includes generating, by the leveling module or the leveling system, actuating signals configured to be sent to leveling mechanisms to tilt the vehicle. In various embodiments, leveling mechanisms may include mechanical, hydraulic, electric, pneumatic, magnetic, or other systems configured to tilt one or more axles (such as axle 114) with respect to the body (such as body 116) of the vehicle.

In one embodiment, the process includes filtering one or more of the first, second, and third signals to remove transient waveforms from the one or more of the first, second, and third signals. For example, one or more of the vehicle sensors may include a filter, and the signal from the sensor may be filtered prior to being received by the leveling system. In other embodiments, the signal may be filtered by another module, filter, or component prior to, or after being received by the leveling system. The signals may be filtered, for example, to prevent transients from resulting in erratic or erroneous leveling signals based on instantaneous changes in the one or more of the first, second, and third signals.

In one embodiment, the process includes filtering the correction signal to match a rate of change of the filtered one or more of the first, second, and third signals. For example, the leveling system, adjustment module, leveling module, or other module may filter the correction signal. In one embodiment, the correction signal is filtered to match a rate of change of the leveling signal.

The order in which the process 600 is described is not intended to be construed as a limitation, and any number of the described process blocks can be combined in any order to implement the processes, or alternate processes. Additionally, individual blocks may be deleted from the processes without departing from the spirit and scope of the subject matter described herein. Furthermore, the processes can be implemented in any suitable hardware, software, firmware, or a combination thereof, without departing from the scope of the subject matter described herein.

In alternate implementations, other techniques may be included in the process 400 in various combinations, and remain within the scope of the disclosure.

Conclusion

Although the implementations of the disclosure have been described in language specific to structural features and/or methodological acts, it is to be understood that the implementations are not necessarily limited to the specific features or acts described. Rather, the specific features and acts are disclosed as representative forms of implementing the invention.

What is claimed is:

1. A method of leveling a vehicle, comprising:
receiving, from a first vehicle sensor, a first signal representing a lateral force acting on the vehicle;
generating a leveling signal based on at least the first signal;
receiving, from a second vehicle sensor, a second signal representing a path of travel of the vehicle;
adjusting the leveling signal to form an adjusted leveling signal based on at least the first signal and the second signal when the second signal indicates a curved path of travel; and
leveling the vehicle using the adjusted leveling signal.

2. The method of claim 1, further comprising receiving, from a third vehicle sensor, a third signal representing a speed of the vehicle; and wherein the vehicle is leveled based on a combination of the first, second, and third signals.

3. The method of claim 2, further comprising adjusting the leveling signal by adjusting the first signal based on at least the second and third signals.

4. The method of claim 2, wherein the third signal represents a speed of rotation of a component of the vehicle.

5. The method of claim 1, wherein the first signal is based on an orientation of the vehicle with respect to gravity.

6. The method of claim 1, wherein the first signal is based at least in part on a centrifugal force acting on the vehicle.

7. The method of claim 1, wherein the second signal represents a wheel angle of the vehicle.

8. An automatic leveling system for a vehicle, comprising:
a processor;
memory coupled to the processor;
a plurality of sensors coupled to the vehicle;
an adjustment module stored in the memory and operable on the processor to:
    receive, from a first vehicle sensor, a first signal representing a lateral force acting on the vehicle;
    generate a leveling signal based on at least the first signal;
    receive, from a second vehicle sensor, a second signal representing a direction of travel of the vehicle; and
    adjust the leveling signal based on at least the first signal and the second signal to produce an adjusted leveling signal; and
a leveling module stored in the memory and operable on the processor to:
    receive the adjusted leveling signal; and
    level the vehicle based on the adjusted leveling signal.

9. The system of claim 8, the adjustment module configured to receive one or more other signals representing operating conditions of the vehicle, and configured to generate the leveling signal based on at least the first signal, the second signal, and the one or more other signals.

10. The system of claim 8, the adjustment module configured to receive a third signal representing a speed of the vehicle, and configured to generate the leveling signal based on at least the first, second, and third signals.

11. The system of claim 8, the adjustment module comprising a filter configured to filter sensor data based on a preset rate of change of the sensor data, the adjustment module configured to generate the leveling signal based on the filtered sensor data.

12. The system of claim 8, the leveling module configured to generate at least one of a left actuation signal and a right actuation signal based on the adjusted leveling signal.

13. The system of claim 8, wherein the first vehicle sensor comprises a clinometer configured to indicate a lateral tilt of the vehicle.

14. The system of claim 8, wherein the second vehicle sensor comprises a wheel angle sensor configured to indicate an angle of at least one wheel of the vehicle with respect to a centerline of the vehicle.

15. The system of claim 8, wherein the adjustment module is operational to adjust the leveling signal based on a portion of the first signal representing a centrifugal force acting on the vehicle.

16. A method of adjusting a leveling system for an overland vehicle, comprising:
    receiving, from a clinometer, a first signal comprising a vehicle lateral tilt signal;
    generating a leveling signal based on the first signal;
    receiving a second signal comprising a vehicle speed signal and a third signal comprising a wheel angle signal;
    adjusting the leveling signal based on the second signal, the third signal, or the second signal and the third signal to produce an adjusted leveling signal; and
    outputting the adjusted leveling signal to the leveling system for leveling the overland vehicle.

17. The method of claim 16, further comprising filtering one or more of the first, second, and third signals to remove transient waveforms from the one or more of the first, second, and third signals.

18. The method of claim 17, further comprising generating a correction signal based on the second signal, the third signal, or the second signal and the third signal, filtering the correction signal to match a rate of change of the filtered one or more of the first, second, and third signals, and adjusting the leveling signal with the filtered correction signal.

19. The method of claim 18, wherein the adjusted leveling signal comprises the first signal combined with the filtered correction signal.

20. The method of claim 18, further comprising subtracting the filtered correction signal from one or more inputs to the leveling system.

* * * * *